Aug. 11, 1953          G. R. MACHIAN ET AL                2,648,759
            APPARATUS FOR FORMING PARTS FROM BRITTLE METAL STRIP
Filed May 11, 1950                                    2 Sheets-Sheet 1
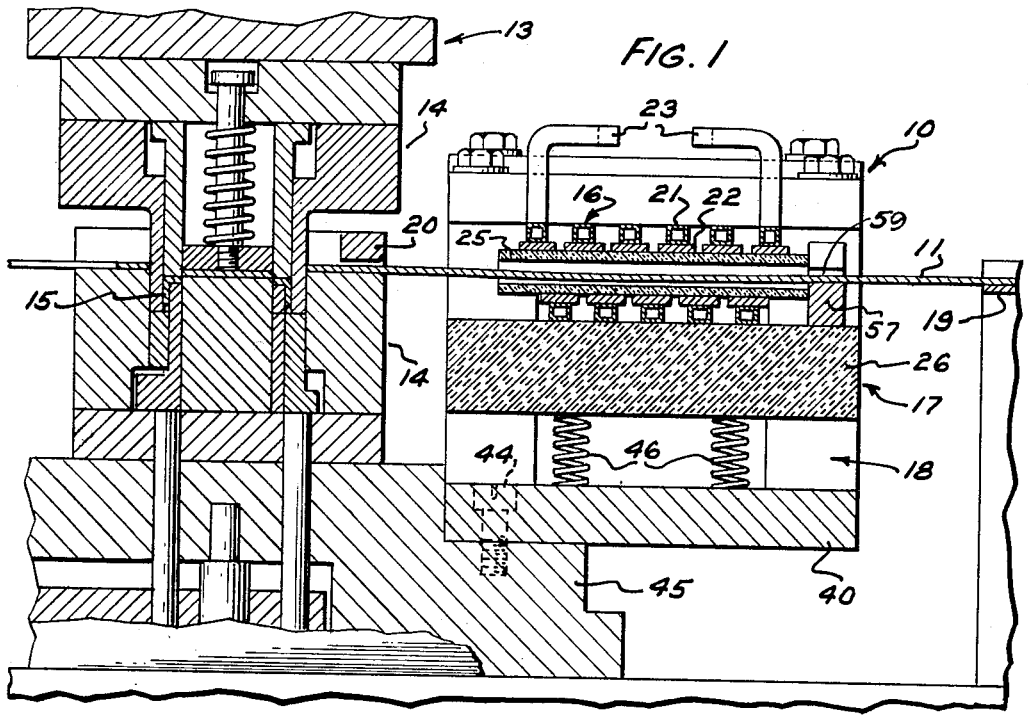
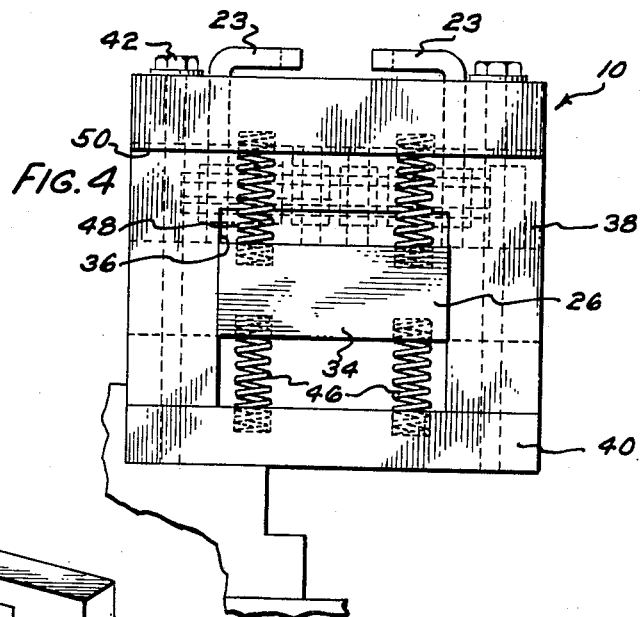
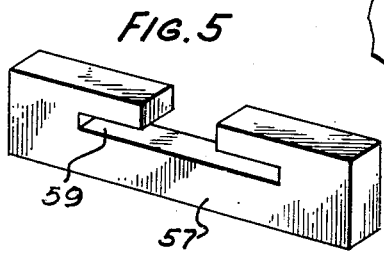
INVENTORS
G. R. MACHIAN
L. R. McCLARY
A. J. PRICKETT
BY
ATTORNEY

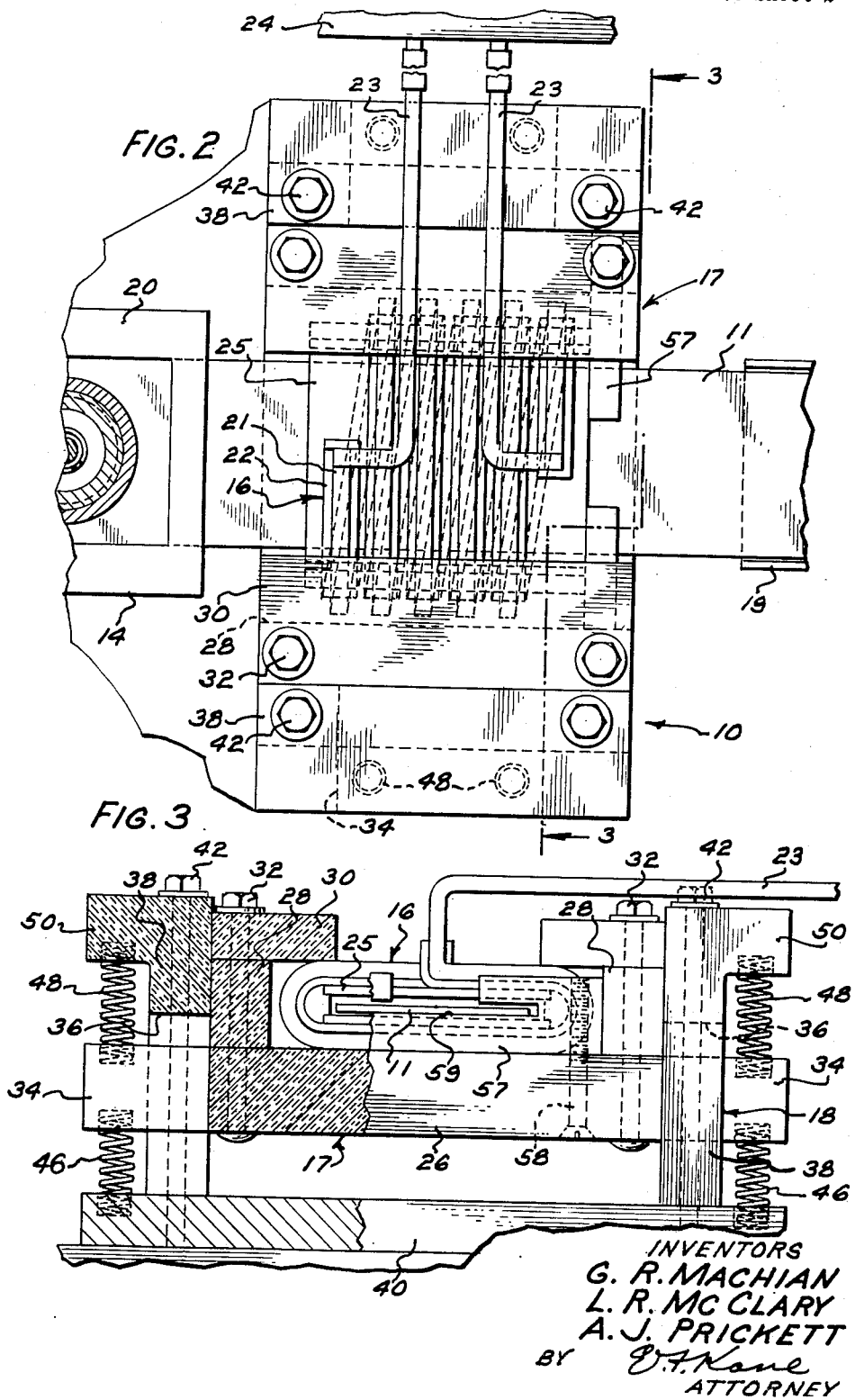

Patented Aug. 11, 1953

2,648,759

UNITED STATES PATENT OFFICE 2,648,759

APPARATUS FOR FORMING PARTS FROM BRITTLE METAL STRIP

George R. Machian, Cicero, Lee R. McClary, Brookfield, and Alfred J. Prickett, Des Plaines, Ill., assignors to Western Electric Company, Incorporated, New York, N. Y., a corporation of New York Application May 11, 1950, Serial No. 161,294

4 Claims. (Cl. 219—47)

This invention relates to apparatus for fabricating metallic articles from stock which is normally very hard and brittle and more particularly to the combination with a forming apparatus of an apparatus for heating successive sections of a metal strip which is hard and brittle at room temperatures to facilitate the fabrication of the strip.

In the manufacture of magnets for telephone apparatus, it has proven advisable to make the magnets from the material known commercially as Remalloy, a molybdenum cobalt iron alloy. In their preferred form these magnets are cup shaped rings or annuli. In the past, it has been proposed, due to the hardness and brittleness of the preferred alloys, to cast these magnets in a mold. Such a practice, however, has proved unsatisfactory for various reasons and attempts were made to fabricate the material from hot rolled stock in punch presses. The material, when formed into sheet stock by hot rolling processes, cannot economically be rolled flat, that is, it has a wavy configuration of quite irregular contour.

In the course of experimenting with the material in an endeavor to develop a cheap method of manufacture, the material was heated to high temperatures and then quickly placed in a forming and shearing press. In this operation, satisfactory parts were formed, but considerable difficulty was experienced in performing these operations at high speed since the forming was practically a forging operation and the materials at high temperatures were difficult to handle.

It is an object of the present invention to provide an apparatus for heating and guiding brittle material to forming apparatus.

In accordance with one embodiment of the invention as applied to the manufacture of annular magnets from molybdenum-cobalt-iron alloys of great hardness and brittleness, there is provided an induction heating coil, mounted for movement to a limited extent closely adjacent a forming press, through which coil a strip of alloy may be fed to the press to heat a portion of the strip prior to forming it. The induction heating coil is provided on its interior with a suitable electrically insulating guide member whereby, as a wavy or undulating strip of material is advanced through the induction coil, the coil will rise and fall to conform to the undulations in the strip and will maintain alignment with the successive portions of the strip as they pass through the coil.

Other objects and advantages of the invention will be apparent by reference to the following detailed description thereof and the accompanying drawing illustrating an embodiment thereof, in which:

Fig. 1 is a vertical longitudinal sectional view of an apparatus for forming parts from a metal strip and showing a portion of a forming press in closed position for acting on successive portions of the strip and a heating fixture for heating the successive portions of the strip prior to their being advanced into the press;

Fig. 2 is a plan view of the apparatus shown in Fig. 1 with parts broken away;

Fig. 3 is a vertical sectional elevational view of the heating fixture taken on the line 3—3 of Figure 2;

Fig. 4 is an end elevational view of the heating fixture; and

Fig. 5 is a perspective view of a guide element of the heating fixture.

Referring to the drawings, particularly Fig. 1, a heating fixture 10 for heating successive portions of a metal strip 11 is shown mounted on a punch press 13 having a set of cooperating dies 14 which are adapted to act on successive sectoins of the strip and form parts such as annular cup-shaped magnets 15 therefrom. The heating fixture comprises, generally, an induction heating coil 16 supported in a holder 17, which together with the coil 16 is mounted for floating movement in a vertical direction in a guide member 18. The coil 16 is disposed in the path of movement of the strip 11 as it is guided into the punch press in a straight path by stationary guides 19 and 20, the latter of which is secured to the lower one of the dies 14.

The induction coil 16 in the form of a horizontally disposed flat helix is deisgned to closely encircle successive sections of the metal strip 11 which is to be heated thereby to concentrate the current induced in the strip and form an efficient heating element. The coil 16 is a composite structure comprising a copper tube 21 through which a coolant is circulated and a flat strip of copper 22 bonded to the innerface of the tube 21. Relatively long ends 23 of the coil 16 extend horizontally from the coil and are connected to a high frequency current generator 24 to form a flexible connection between the coil and the generator, permitting vertical movement of the coil. With the strip 11 within the coil 16 the portions of the coil disposed above and below the strip are relatively close thereto and to prevent the metal strip 11 from contacting the coil and short circuiting portions of it, a tubular lining member 25 of insulation such as hard asbestos lumber is secured in telescoping relation within the coil and forms a guideway for the strip through the coil.

The holder 17 for the coil 16 comprises a plate 26 on which the coil 16 is supported, a pair of spacer members 28—28 on opposite sides of the coil, and a pair of clamping members 30—30 engaging the upper side portions of the coil, the parts 26, 28 and 30 being clamped together by bolts 32 of non-ferrous metal to hold the coil in position in the holder 17. The plate 26 and the members 28 and 30 are made from insulating material such as asbestos lumber.

The end portions of the plates 26 of the holder 17 are reduced in width to provide tongues 34 which extend through vertical slots or recesses 36 formed in vertical wall members 38—38 at each end of the guide 18 of the fixture. Made from insulating material such as phenol-fibre, the wall members 38 are secured to a plate 40 by bolts 42 and slidably engage portions of the plate 26 and the members 28 and 30 of the holder 17 for guiding the holder for vertical movement. The plate 40 of the fixture is secured as by means of bolts 44 (Fig. 1) to the die plate 45 on which the lower one of the dies 14 is mounted. The holder 17 is resiliently mounted in the fixture to support the coil 16 in horizontal alignment with the guides 19 and 20 by sets of coil springs 46 of non-ferrous metal interposed between the plates 26 and 40 at each end thereof, and sets of springs 48 interposed between the plate 26 and laterally extending portions 50 of the wall members 38. With this construction, the coil 16 is mounted for free floating movement in a vertical direction.

At the forward end of the guideway 25 and in spaced relation to the coil 16, is mounted a metal block 57 of brass or other non-ferrous metal, secured to the wall 26 of the holder by screws 58. The block 57 is provided with a recess or slot 59 forming a guideway aligned with the guideway 25 for the reception of the strip 11 therethrough. The width and height of the slot 59 is greater than the width and thickness of the strip 11 and is less than the width and height of the guideway in the tubular member 25, and the metal block 57 forms a wear member and guide so that portions of a wavy or an irregular strip passing therethrough will engage the upper or lower walls thereof and impart vertical movement to the holder to maintain the horizontal centerline of the coil 16 substantially at a level with that of successive portions of a strip passing therethrough.

In the operation of the apparatus a strip 11 is advanced into the coil 16 and along the guides 20 and 19 and stopped with the forward portion thereof in the coil after which the operator actuates a timing device to turn on the high frequency current for a predetermined time and cause the section of the strip within the coil to be heated to a predetermined temperature. Immediately upon completion of the heating cycle the strip is advanced by the operator to position the heated section thereof in alignment with the dies of the punch press and the press is actuated to cause the dies to blank, perforate and draw the annular part 15 therefrom while the section of the strip is heated and in a pliable condition. After the part 15 has been formed and ejected from the dies the strip is retracted to position the next section of the strip within the coil and the cycle of operation is repeated.

When a bulged portion of the strip enters the guideway 59 and the coil 16, the bulged portion engages the wall of the guideway 59 and moves the guide 57, the holder 17 and the coil 16 vertically in the direction of the bulge to align the coil with the section of the strip within the coil.

From the foregoing it will be seen that there has been devised an effective apparatus for forming parts from a metal strip which is hard and brittle at ordinary room temperatures and which employs an induction coil closely encircling the strip for efficiently heating sections thereof adjacent the forming apparatus, and which is mounted for floating movement to accommodate and heat metal strip with bulges or undulations therein without sacrificing the heating efficiency of the coil.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A heating fixture for heating successive sections of a relatively straight strip of metal having undulations therein for use in an apparatus having cooperable relatively movable tools for making parts from said heated sections of said strip and having guide means including a stationary guideway adjacent said tools for guiding the strip in a predetermined path relative to said tools comprising an induction coil for receiving a portion of said strip therein and connectible to a source of high frequency current, a holder for said coil, guide means for guiding said holder and coil for straight line vertical movement, resilient means for yieldably supporting said holder in said guide means in a position to align said coil with said stationary guideway, and a guide member on said holder engageable with undulations on said strip for moving and aligning said coil with successive portions of a strip advanced through said coil.

2. In an apparatus for forming metallic parts from a strip of hard and brittle alloy having undulations therein the combination of a forming press having cooperable relatively movable tools, guide means including a stationary guideway adjacent said tools and a stationary support spaced from said tools for guiding a strip into said press along a predetermined path, an induction heating coil mounted adjacent said press between said stationary guideway and said stationary support for receiving successive portions of said strip therein and connectible to a source of high frequency current for heating the successive portions of said strip, a holder for said coil, guide means guiding said holder for vertical movement, resilient means yieldably supporting said holder on said guide means at a predetermined level to position said coil in alignment with said stationary guideway and in the path of movement of said strip, insulating means on said coil for guiding said strip through said coil in spaced relation thereto, and a member on said holder engageable with the undulations in said strip for moving said holder vertically and aligning said coil with successive portions of a strip moved through said coil.

3. In an apparatus for forming parts from successive sections of a hard and brittle strip of metal having undulations therein, the combination of a forming press having cooperable relatively movable forming tools, guide means including a stationary guideway adjacent said tools and a stationary support spaced from said press for guiding a strip into said press in a predetermined path relative to said tools, an induction heating coil mounted adjacent said press between said stationary guideway and said stationary support in the path of movement of said strip for receiving successive sections of said strip therein, a source of high frequency current, flexible means connecting said coil to said source of high frequency current, a holder for said coil, guide means guiding said holder for movement transversely to the path of movement of said strip, resilient means yieldably supporting said holder in said guide means in a predetermined position to align the coil with said stationary guideway and in the path of movement of said strip, and means on said holder engageable with the undulations on said strip for moving said strip and aligning said coil with successive sections of said strip as it is moved through said coil.

4. A heating fixture for heating successive sections of a metal strip having longitudinally extending waves or undulations therein for use with an apparatus having cooperable relatively movable tools and a guideway for guiding the strip in a predetermined position relative to said tools for making parts from said heated sections of said strip comprising an induction coil for encircling successive portions of a strip advanced in one direction therethrough and having flexible leads connectible to a source of high frequency current, a tubular guide of insulating material telescopingly mounted within said coil for guiding said strip through said coil in spaced relation thereto, a holder for said coil, guide means for guiding said holder and said coil for movement perpendicularly to the direction of movement of said strip, spring means yieldably supporting said holder in a predetermined position in said guide means to align the coil with said stationary guideway of said apparatus, and a wear member on said holder in spaced relation to one end of said coil forming a guideway engageable with the undulations of said strip for moving and aligning said coil with successive portions of said strip as it is advanced through said coil.

GEORGE R. MACHIAN.
LEE R. McCLARY.
ALFRED J. PRICKETT.

References Cited in the file of this patent

UNITED STATES PATENTS

| Number | Name | Date |
|---|---|---|
| 2,276,521 | Stark | Mar. 17, 1942 |
| 2,335,495 | Fink | Nov. 30, 1943 |
| 2,367,715 | Chapman | Jan. 23, 1945 |
| 2,372,516 | Rechton et al. | Mar. 27, 1945 |
| 2,449,365 | Bober et al. | Sept. 14, 1948 |
| 2,452,197 | Kennedy | Oct. 26, 1948 |
| 2,461,323 | Hille | Feb. 8, 1949 |
| 2,554,076 | Vissat | May 22, 1951 |
| 2,591,339 | Davis | Apr. 1, 1952 |

FOREIGN PATENTS

| Number | Country | Date |
|---|---|---|
| 620,432 | Great Britain | Mar. 24, 1949 |